(12) United States Patent
Ramachandran et al.

(10) Patent No.: US 8,605,895 B2
(45) Date of Patent: Dec. 10, 2013

(54) COMPUTING THE $E^{th}$ ROOT OF A NUMBER USING A VARIANT OF THE RSA ALGORITHM (FOR EVEN E'S)

(75) Inventors: Arun C. Ramachandran, Coimbatore (IN); Puvichakravarthy Ramachandran, Madurai (IN); Lakshmanan Velusamy, Coimbatore (IN)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 13/325,000

(22) Filed: Dec. 13, 2011

(65) Prior Publication Data

US 2013/0148809 A1    Jun. 13, 2013

(51) Int. Cl.
*G06F 21/00* (2013.01)
(52) U.S. Cl.
USPC .......................................................... 380/30
(58) Field of Classification Search
None
See application file for complete search history.

(56) References Cited

U.S. PATENT DOCUMENTS

| | | | |
|---|---|---|---|
| 4,298,951 A | | 11/1981 | Hall |
| 6,028,933 A | * | 2/2000 | Heer et al. ..................... 713/169 |
| 6,151,679 A | * | 11/2000 | Friedman et al. ................. 726/3 |
| 6,760,752 B1 | * | 7/2004 | Liu et al. ........................ 709/206 |
| 7,668,898 B2 | | 2/2010 | Manor et al. |
| 2009/0164435 A1 | | 6/2009 | Routt |

OTHER PUBLICATIONS

Bernstein, "RSA signatures and Rabin-Williams signatures: the state of the art", 2008, University of Illinois at Chicago, pp. 1-11.*
"Novel Mechanism to efficiently calculate the nth root of a number using cryptology", Originally published in Prior Art Database Obtained from internet: URL:http://ip.com/IPCOM/000202415 Disclosure No. IPCOM000202415D Dec. 15, 2010 , 7 pages.

* cited by examiner

*Primary Examiner* — Benjamin Lanier
(74) *Attorney, Agent, or Firm* — DeLizio Gilliam, PLLC

(57) ABSTRACT

An $E^{th}$ root unit is configured to compute an $E^{th}$ root of a number A with a machine. The $E^{th}$ root unit locates a value E, which is even, in a first entry of a plurality of entries of a structure. The $E^{th}$ root unit is configured to read a product of the pair of prime numbers from the first entry. The $E^{th}$ root unit is configured to read a second of the pair of key values in the first entry. The $E^{th}$ root unit is configured to encrypt the number A using the product of the pair of prime numbers to generate an encrypted value. The $E^{th}$ root unit is configured to apply a decryption operation to the encrypted value using the second of the pair of key values to generate an intermediate value. The $E^{th}$ root unit is configured to compute a square root of the intermediate value.

20 Claims, 4 Drawing Sheets

US 8,605,895 B2

COMPUTING THE $E^{th}$ ROOT OF A NUMBER USING A VARIANT OF THE RSA ALGORITHM (FOR EVEN E'S)

BACKGROUND

Embodiments of the inventive subject matter generally relate to the field of computing, and, more particularly, to efficiently computing the $e^{th}$ root of a number for even e's.

Roots are particularly important in the theory of infinite series (e.g., the root test determines the radius of convergence of a power series). Roots can also be defined for complex numbers, and the complex roots of 1 (the roots of unity) play an important role in higher mathematics. Computing the $e^{th}$ root of a number is applicable in various mathematical and scientific applications, which include cryptography and solving complex mathematical equations. Computing the $e^{th}$ root of a number (e.g., $n^{th}$ root algorithm) is intensive in terms of time and computational resources.

SUMMARY

Embodiments of the inventive subject matter include a method to compute an $E^{th}$ root of a number A with a machine. The method locates a value E, which is even, in a first entry of a plurality of entries of a structure. Each of the plurality of entries comprises a pair of prime numbers P and Q that are a distinct combination of prime numbers with respect to the other entries, a product of the pair of prime numbers, and a pair of key values. The pair of key values satisfy a property that a product of the pair of key values is $K*(P-1)*(Q-1)+2$, wherein K is a positive integer. The value E is a first key value of the pair of key values in the first entry. The method reads the product of the pair of prime numbers from the first entry. The method reads a second of the pair of key values in the first entry. The method encrypts the number A using the product of the pair of prime numbers to generate an encrypted value. The method applies a decryption operation to the encrypted value using the second of the pair of key values to generate an intermediate value. The method computes a square root of the intermediate value. The method supplies the square root of the intermediate value as the $E^{th}$ root of the number.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
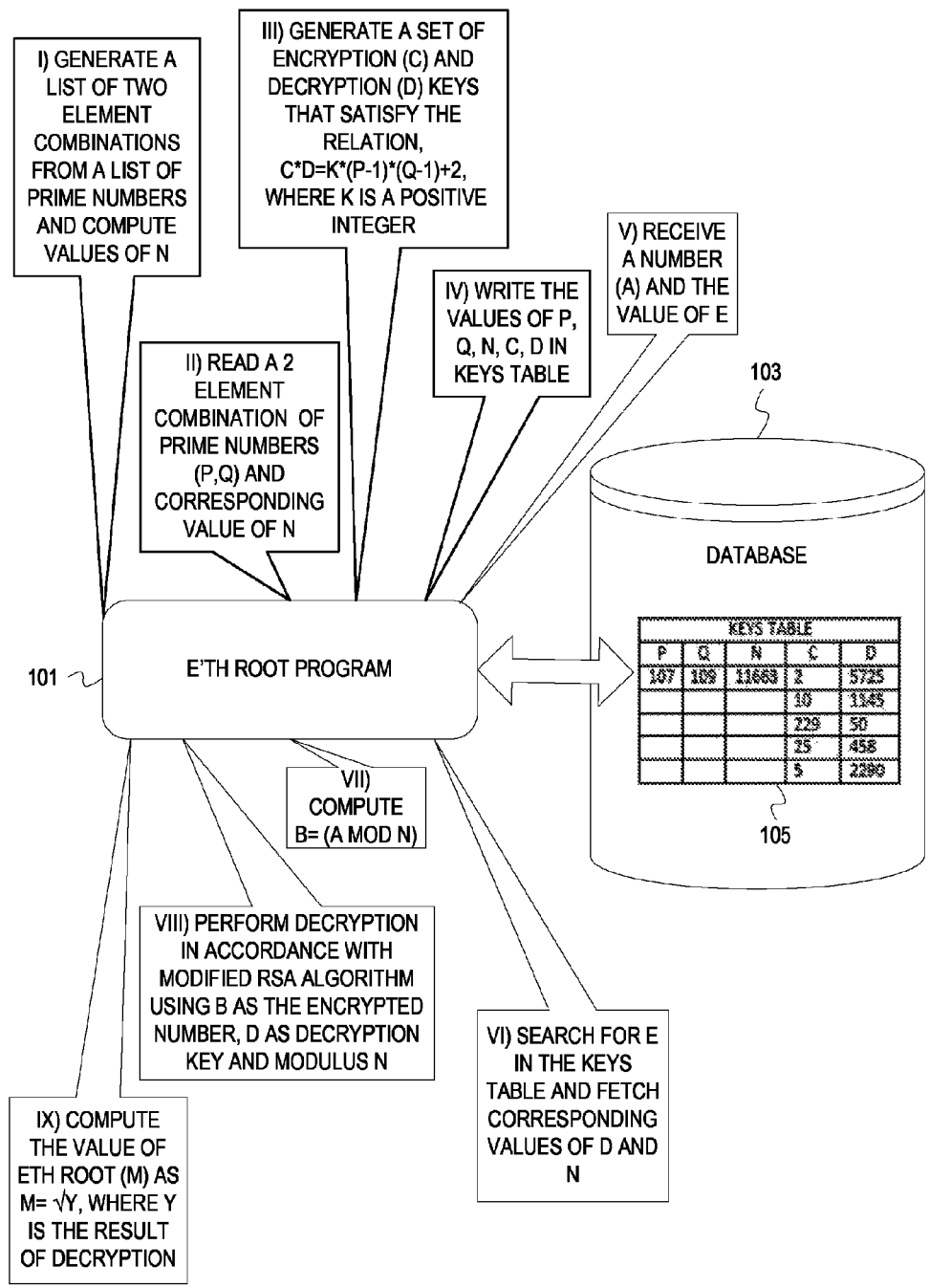
FIG. 1 depicts an example conceptual diagram to compute the $e^{th}$ root of a number, for even e's.

The description that follows includes exemplary systems, methods, techniques, instruction sequences and computer program products that embody techniques of the present inventive subject matter. However, it is understood that the described embodiments may be practiced without these specific details. For instance, although examples refer to an $e^{th}$ root program, embodiments can have $e^{th}$ root determined by the logic implemented on a hardware chip (e.g., FPGA). In other instances, well-known instruction instances, protocols, structures and techniques have not been shown in detail in order not to obfuscate the description.

An $e^{th}$ root program can efficiently compute an $e^{th}$ root (for even e's) of a number. The term "program" is used herein to refer to either a set of computer program instructions or to an executing instance of the set of computer program instructions. The $e^{th}$ root program computes the $e^{th}$ root of the number using modular arithmetic. The $e^{th}$ root program reduces the complexity of computing the $e^{th}$ root to computing a series of relatively simple operations, including computing a square root. The $e^{th}$ root program operates on expressions with the value of $e^{th}$ root being a whole number, and the value of which the $e^{th}$ root is computed being a whole number. The $e^{th}$ root program utilizes Fermat's theorem and a variant of an asymmetric key algorithm. This description refers to a variant of the RSA (Rivest, Shamir and Adleman) algorithm when describing example embodiments, but embodiments are not so limited. Other examples of asymmetric key algorithms that can be leveraged for computing the $e^{th}$ root of a number for an even e include the Digital Signature Algorithm, the ElGamal algorithm, the Merkle-Hellman knapsack algorithm, and the Diffie-Hellman algorithm. An asymmetric key algorithm variant is based on a relation between an encryption key and a decryption key derived using Fermat's theorem. With keys that satisfy this relation, the decryption operation of the asymmetric key algorithm variant produces a square of the original value that was encrypted. The $e^{th}$ root program computes values for an encryption key, a decryption key, and a modulus that satisfy the relation; and stores the values in a keys table. The $e^{th}$ root program utilizes the value of e as the encryption key and the number for which the $e^{th}$ root is to be computed as the $e^{th}$ power of the value of $e^{th}$ root. The $e^{th}$ root program computes an encrypted number in accordance with the asymmetric key algorithm variant from the value for which the $e^{th}$ root is being computed. The $e^{th}$ root program then decrypts the encrypted number in accordance with the asymmetric key algorithm variant. For decryption, the $e^{th}$ root program utilizes a value of the decryption key corresponding to the value of the encryption key from the keys table. The result of decryption is a square of the value of the $e^{th}$ root of the number. The $e^{th}$ root program then computes a square root of the value obtained after decryption to determine the $e^{th}$ root of the number.

FIG. 1 depicts a conceptual diagram to determine the $e^{th}$ root of a number, for even e's.

FIG. 1 depicts an $e^{th}$ root program 101, a database 103 and a keys table 105. The $e^{th}$ root program 101 performs operations to determine the $e^{th}$ root of a number. The $e^{th}$ root program 101 creates the keys table 105 in the database 103. The keys table 105 stores values of two prime numbers (P and Q), modulus (N), encryption key (C) and decryption key (D) in respective columns P, Q, N, C, D. The $e^{th}$ root program 101 uses values of N, C, D for encryption and decryption in accordance with a RSA algorithm variant. The $e^{th}$ root program 101 computes the modulus, N, as the product of prime numbers P and Q. The $e^{th}$ root program 101 determines the values of P and Q from a list of prime numbers, using a variety of possible distinct combinations of two prime numbers. The $e^{th}$ root program 101 computes a list of encryption and decryption keys for the RSA algorithm variant using the relation:

$$C*D = K*(P-1)*(Q-1)+2,$$
where $K$ is a positive integer.  (1)

Equation 1, is derived using Fermat's theorem, as illustrated in the following equations:
In accordance with Fermat's theorem, $$(a\ \text{power}(P-1))\bmod P = 1 \quad (2)$$

Similarly, $$(a\ \text{power}(Q-1))\bmod Q = 1 \quad (3),$$

where "a" is a natural number and "mod" stands for the modulus operation.
Multiplying (2) and (3), $$(a(\text{power}((P-1)*(Q-1))))\bmod PQ = 1 \quad (4)$$

Multiplying both sides of (4) by a, $$(a*(a(\text{power}((P-1)*(Q-1)))))\bmod PQ = a \quad (5)$$

[provided $a < (P*Q)$]
Multiplying both sides of (5) by a, $$(a*a*(a(\text{power}((P-1)*(Q-1)))))\bmod PQ = a*a \quad (6)$$

Combining powers of a, $$(a(\text{power}((P-1)*(Q-1)+2)))\bmod PQ = a^2 \quad (7)$$

Using equation 7, the keys C (encryption key) and D (decryption key) for the RSA algorithm variant are chosen such that Equation 7 can be expressed with the keys as, $$C*D = K*(P-1)*(Q-1)+2 \quad (8),$$

where K is a positive integer.
Equation 8 is identical to equation 1 and expresses the relation between an encryption key and a decryption key for the RSA algorithm variant. Decryption using the RSA algorithm variant returns a square of the number that was encrypted using the RSA algorithm variant.
Encryption using the RSA algorithm variant is accomplished as:

$$B = (M\ \text{power}(C))\bmod N \quad (9),$$

where N is the modulus for the RSA algorithm variant, N=P*Q, M is the number to be encrypted and B is the result of encryption
Decryption using the RSA algorithm variant is accomplished as:

$$Y = (B\ \text{power}(D))\bmod N \quad (10),$$

where Y is the result of decryption. Also, Y=M*M, and the square root of Y returns the number M.
The $e^{th}$ root program 101 utilizes the encryption key, C, as the value of e and the number A, received by the $e^{th}$ root program 101 as A=(M power (C)). M is the $e^{th}$ root of A, and the $e^{th}$ root program 101 computes the value of M. The $e^{th}$ root program 101 reads values of N, C and D from the keys table 105. The $e^{th}$ root program 101 searches for the value of e in the keys table 105. The $e^{th}$ root program 101 searches for the value of e in only those tuples of the keys table 105 that correspond to a value of N, such that:

$$N > 10\ \text{power}(2*\text{ceiling}((\text{Number of digits in } A)/e)) \quad (11)$$

Expression 11 ensures that M*M is always less than N. Expression 11 is derived on the concept that when a number is multiplied by itself e times, the maximum number of digits in the result is e times the number of digits in the number. When A=M power e, the number of digits in M is not greater than ceiling((Number of digits in A)/e). An upper bound on the value of M can be computed as 10 power (ceiling((Number of digits in A)/e)). For example, in the equation 8000=20 power 3. The number of digits in 8000 is 4. An upper bound for 20 is computed as 10 power (ceiling(4/3)) i.e., 10 power 2=100.
Similarly, number of digits in M*M cannot be greater than ceiling(2*(Number of digits in A)/e). Hence, a lower bound on value of N can be computed using the relation:

$$N > 10\ \text{power}(2*\text{ceiling}((\text{Number of digits in } A)/e)).$$

The $e^{th}$ root program 101 first computes the encrypted number B, as depicted in equation 9 using the values of N and C. The $e^{th}$ root program 101 then computes the result of decryption Y, as depicted in equation 10 using the values of N and D. The $e^{th}$ root program 101 finally computes the square root of Y to determine the value of M. The $e^{th}$ root program 101 performs operations depicted in a sequence of stages I through IX.

At stage I, the $e^{th}$ root program 101 generates a list of 2 element combinations ($^zC_2$) from a list of z prime numbers and computes a value of N for each of the two element combinations. The list of z prime numbers may be programmed into the $e^{th}$ root program 101 or specified by an administrator. The value of N is a product of the two prime numbers in the 2 element combination. N is utilized as the modulus for the RSA algorithm variant. The $e^{th}$ root program 101 sorts the list of 2 element combinations in a decreasing order of values of N. The $e^{th}$ root program 101 stores the sorted list of 2 element combinations and corresponding values of N in the memory.

At stage II, the $e^{th}$ root program 101 reads a 2 element combination of prime numbers from the sorted list and the corresponding value of N. The prime numbers in the 2 element combination are referred to as P and Q. The $e^{th}$ root program 101 reads the 2 element combination from beginning of the sorted list. The $e^{th}$ root program 101 utilizes the values of P, Q and N selected at stage II in operations at stages III and IV.

At stage III, the $e^{th}$ root program 101 generates a set of encryption and decryption keys in accordance with equation 8. The $e^{th}$ root program 101 computes the value of the right hand side of the equation 8 (hereinafter "r.h.s. of eq. 8"), for certain values of K. The values of K are positive integers and the values of K can be programmed into the $e^{th}$ root program 101 or specified by the administrator. In some embodiments, the administrator specifies an upper limit for the value of K and the $e^{th}$ root program 101 utilizes values of K starting from 1 up to the upper limit. For each value of K, the $e^{th}$ root program 101 factorizes the r.h.s. of eq. 8 in accordance with Dixon's algorithm. The r.h.s. of eq. 8 is an even number, and can be expressed as a product of an even number with an even or odd number. The $e^{th}$ root program 101 lists all possible combination of two factors, such that the product of the two factors results in the r.h.s. of eq. 8. The $e^{th}$ root program 101 lists even factors as values of the encryption key, C, and corresponding factors as values of the decryption key, D. The $e^{th}$ root program 101 repeats the factorization of the r.h.s. of eq. 8 for all values of K and computes a set of values for C and D.

At stage IV, the $e^{th}$ root program 101 writes the values of P, Q, N along with the set of values for C and D (computed in stage III) in the keys table 105. The keys table 105 includes five columns with column names P, Q, N, C and D for the respective values of P, Q, N, C and D. The $e^{th}$ root program 101 writes the values of P, Q and N as computed in Stage I once for the corresponding set of values of C and D. In some embodiments, the $e^{th}$ root program 101 writes the values of P, Q and N into the keys table at stage II. The $e^{th}$ root program 101 writes the corresponding set of values of C and D at stage IV.

The $e^{th}$ root program 101 repeats operations of stages II, III and IV until the 2 element combination of prime numbers (P,Q) and the corresponding values of N, C and D are written into the keys table 105. The $e^{th}$ root program 101 reads the list of 2 element combinations of prime numbers in descending order of values of N, and the $e^{th}$ root program 101 writes the entries in the keys table 105 in descending order of values of N. The $e^{th}$ root program 101 reduces computation complexity for searching of values of e by writing the entries in a descending order of values of N. Storing entries in descending order of values of N reduces the number of entries to be searched in the table. The $e^{th}$ root program 101 can perform the operations of stages II, III and IV at any time instance when system resources are available. The operations of stages II, III, IV are independent of the $e^{th}$ root program 101 receiving a number to compute the $e^{th}$ root of the number.

At stage V, the $e^{th}$ root program 101 receives a number, A, and the value of e. The $e^{th}$ root program 101 can receive a mathematical expression or a statement as input. The $e^{th}$ root program 101 extracts the values of A and e from the mathematical expression or the statement. The $e^{th}$ root program 101 can receive input from another program or an event in the operating system space.

At stage VI, the $e^{th}$ root program 101 searches for the value of e in the keys table 105 and fetches the corresponding values of D and N. The $e^{th}$ root program 101 first determines whether the value of e is even or odd. The $e^{th}$ root program 101 searches for the value of e in the keys table 105 when the value of e is even. The $e^{th}$ root program 101 returns an error or transfers the control to another program when the value of e is odd. The $e^{th}$ root program 101 searches for the value of e in the columns C and D of the keys table 105. The $e^{th}$ root program 101 searches for the value of e in those tuples of the keys table 105 that satisfy the condition for values of N stated in expression 11. The keys table 105 stores entries in descending order of values of N. The $e^{th}$ root program 101 starts the search for the value of e from the beginning of the keys table 105. The $e^{th}$ root program 101 stops the search for the value of e when the value of N is less than right hand side of expression 11. The value of e is an even number and the value of e is typically found in column C. When the value of e is found in column C, the $e^{th}$ root program 101 reads the corresponding values of D and N from the keys table 105. When the value of e is not found in column C, the $e^{th}$ root program 101 searches for the value of e in column D. If the value of e is found in column D, the $e^{th}$ root program 101 reads the corresponding entry in column C as the value of decryption key for the RSA algorithm variant. The values of encryption key, C and decryption key, D are complimentary. A number encrypted using a decryption key can be decrypted using the corresponding encryption key. When the value of e is not found in either column C or column D, the $e^{th}$ root program 101 extends the list of prime numbers used to compute values in the keys table 105. The $e^{th}$ root program 101 then repeats operations of stages I, II and III to compute the values of P, Q, N, C and D for prime numbers in the extended list. In some embodiments, when the value of e is not found in either column C or column D, the $e^{th}$ root program 101 returns an error. In some embodiments, the $e^{th}$ root program 101 suspends the operations and transfers control to another program when the value of e is not found in either column C or column D.

At stage VII, the $e^{th}$ root program 101 computes the value of B as (A mod N). The $e^{th}$ root program 101 computes the value of B in accordance with the RSA algorithm variant.

At stage VIII, the $e^{th}$ root program 101 performs decryption in accordance with the RSA algorithm variant using B as the encrypted number, D as the decryption key and N as the modulus. The $e^{th}$ root program 101 performs decryption in accordance with equation 10. The operation of computing (B power D) is simplified using the exponentiation by squaring technique. The exponentiation by squaring performs fast computation of large integer powers of a number. The $e^{th}$ root program 101 then computes a residue of (B power D) reduced to modulo N. The square root of the residue is the $e^{th}$ root of the number A. The $e^{th}$ root program 101 supplies the $e^{th}$ root for use by any one of a cryptography system, a mathematics program, an engineering program, a scientific program, a graphics program, etc. For example, the $e^{th}$ root can be sent to a graphics engine, a processor design engine, etc. In some embodiments, the $e^{th}$ root program is a component of cryptography software, mathematics software, graphics software, design software, or scientific software. The $e^{th}$ root program 101 provides a fast technique to compute the $e^{th}$ root of a number using multiplication modulo as inverse. The $e^{th}$ root program 101 simplifies computing the $e^{th}$ root of a number to computing an exponent of a number and a couple of other simple operations that include computing a residue and a square root operation.

Figure 2:
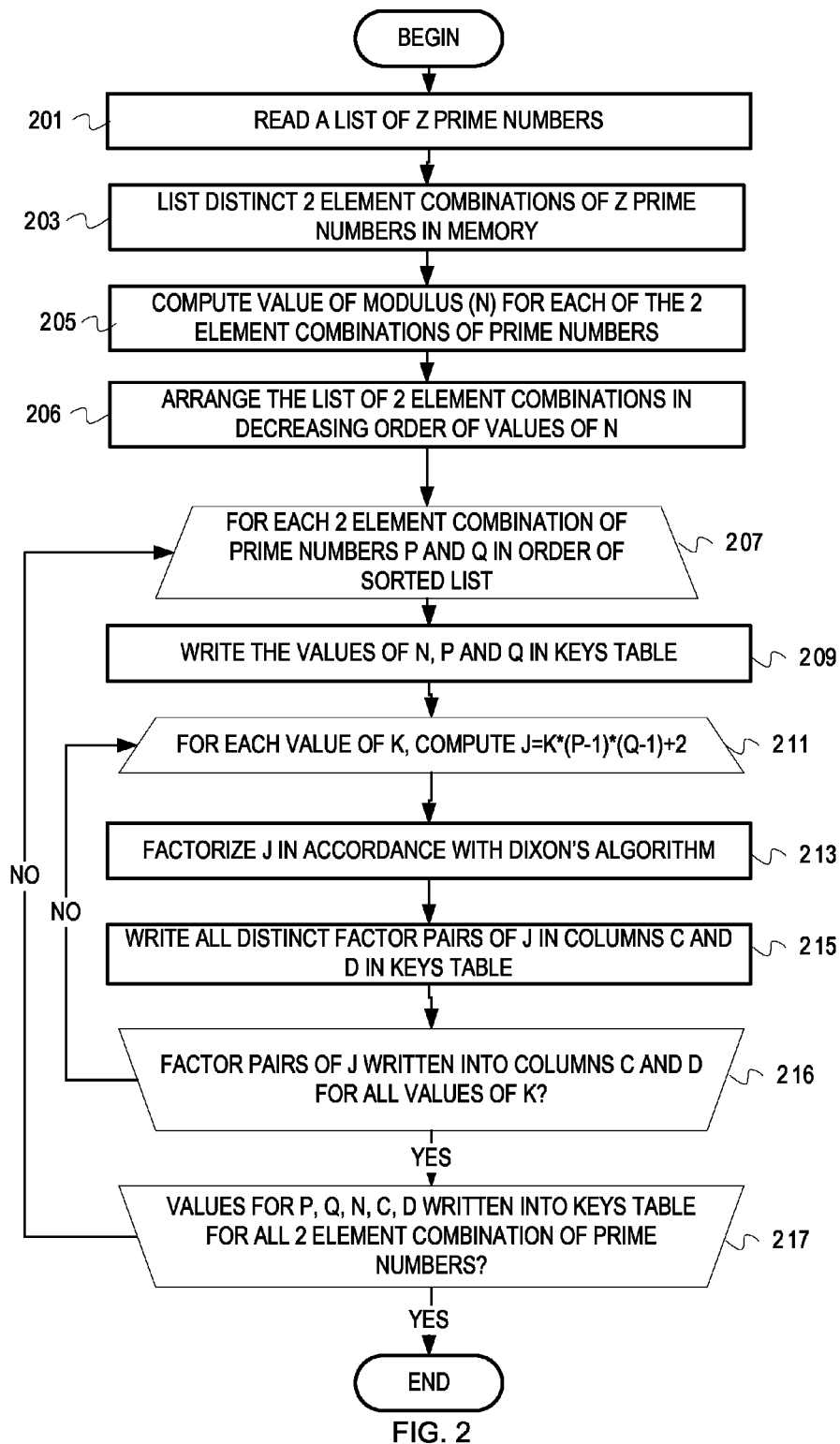
FIG. 2 illustrates a flow diagram of example operations to compute a keys table for a RSA algorithm variant.

FIG. 2 illustrates a flow diagram of example operations to compute a keys table for a RSA algorithm variant.

At block 201, an $e^{th}$ root program reads a list of z prime numbers. The list of z prime numbers is programmed into the $e^{th}$ root program by an administrator.

At block 203, the $e^{th}$ root program lists distinct 2 element combinations of z prime numbers in the memory. The $e^{th}$ root program determines all distinct 2 element combinations from a list of z prime numbers in accordance with the combinations principle $^zC_2$. The $e^{th}$ root program writes all distinct 2 element combinations as a list in the memory.

At block 205, the $e^{th}$ root program computes a value of modulus (N) for each of the 2 element combinations of prime numbers. The value of N is defined as a product of the two prime numbers in a 2 element combination.

At block 206, the $e^{th}$ root program arranges the list of 2 element combinations in a decreasing order of values of N. The $e^{th}$ root program sorts the values of N in accordance with the insertion sort algorithm. The $e^{th}$ root program then arranges the list of 2 element combinations in a decreasing order of values of N. In some embodiments, the $e^{th}$ root program utilizes other sort algorithms (e.g., selection sort, bubble sort, etc.) to sort the values of N.

At block 207, the $e^{th}$ root program starts a loop for each of the 2 element combination of prime numbers. The loop includes operations at blocks 209, 211, 213, 215, 216 and 217. In a first iteration of the loop, the $e^{th}$ root program selects the first 2 element combination of prime numbers from the list of 2 element combinations arranged in decreasing order of values of N. In successive iterations of the loop, the $e^{th}$ root program selects the next 2 element combination of prime numbers from the list. The prime numbers selected in iteration of the loop are referred to as P and Q.

At block 209, the $e^{th}$ root program writes the values of N, P and Q in a keys table. The keys table includes five columns for the values of N, P, Q, C (encryption key) and D (decryption key). The $e^{th}$ root program writes the values of N, P and Q in their respective columns.

At block 211, the $e^{th}$ root program starts a loop for each value of K and computes the value of J for the value of K in the current iteration of the loop. The $e^{th}$ root program computes the value of J as (K*(P−1)*(Q−1)+2). The values of K are positive integers. The values of K are programmed into the $e^{th}$ root program by the administrator. The loop includes operations at blocks 213, 215 and 216.

At block 213, the $e^{th}$ root program factorizes the value of J in accordance with Dixon's algorithm. The $e^{th}$ root program utilizes Dixon's algorithm to compute all prime number factors of J. The $e^{th}$ root program writes all the prime number factors of J in memory.

At block 215, the $e^{th}$ root program writes all distinct factor pairs of J in columns C and D in the keys table. For instance, the $e^{th}$ root program reads all of the prime number factors of J from the memory, which were computed at block 213. The $e^{th}$ root program combines the prime number factors of J such that J is expressed as a product of a pair of factors. The $e^{th}$ root program combines the prime number factors by multiplying the prime number factors. The $e^{th}$ root program determines all distinct possible combinations of factor pairs of J and writes the factors pairs in columns C and D in the keys table. The value of J is an even number and one of the two factors of J is always even. The $e^{th}$ root program writes the even factor of J in column C and the second factor of J in column D in the keys table. For example, assume a value of 18 for J. The $e^{th}$ root program utilizes Dixon's algorithm to determine prime number factors of J as (2, 3, 3) at block 213. The $e^{th}$ root program then combines the prime factors to express J as product of factor pairs and determines all distinct possible combinations, i.e., (2*3,3), (2,3*3). The $e^{th}$ root program writes the values of (C, D) as (6, 3) and (2, 9) in different tuples of the keys table.

At block 216, the $e^{th}$ root program determines whether factor pairs of J are written into columns C and D for all values of K. If factor pairs of J are written into columns C and D for all values of K, control flows to block 217. If factor pairs of J are not written into columns C and D for all values of K, control flows to block 211 and the $e^{th}$ root program performs a next iteration of the loop.

At block 217, the $e^{th}$ root program determines whether values of P, Q, N, C and D are written into the keys table for all 2 element combination of prime numbers. If values of P, Q, N, C and D are written into the keys table for all 2 element combinations of prime numbers, the $e^{th}$ root program ends the process. If values of P, Q, N, C and D are not written into the keys table for all 2 element combination of prime numbers, control flows to block 207 and the $e^{th}$ root program performs a next iteration of the loop.

Figure 3:
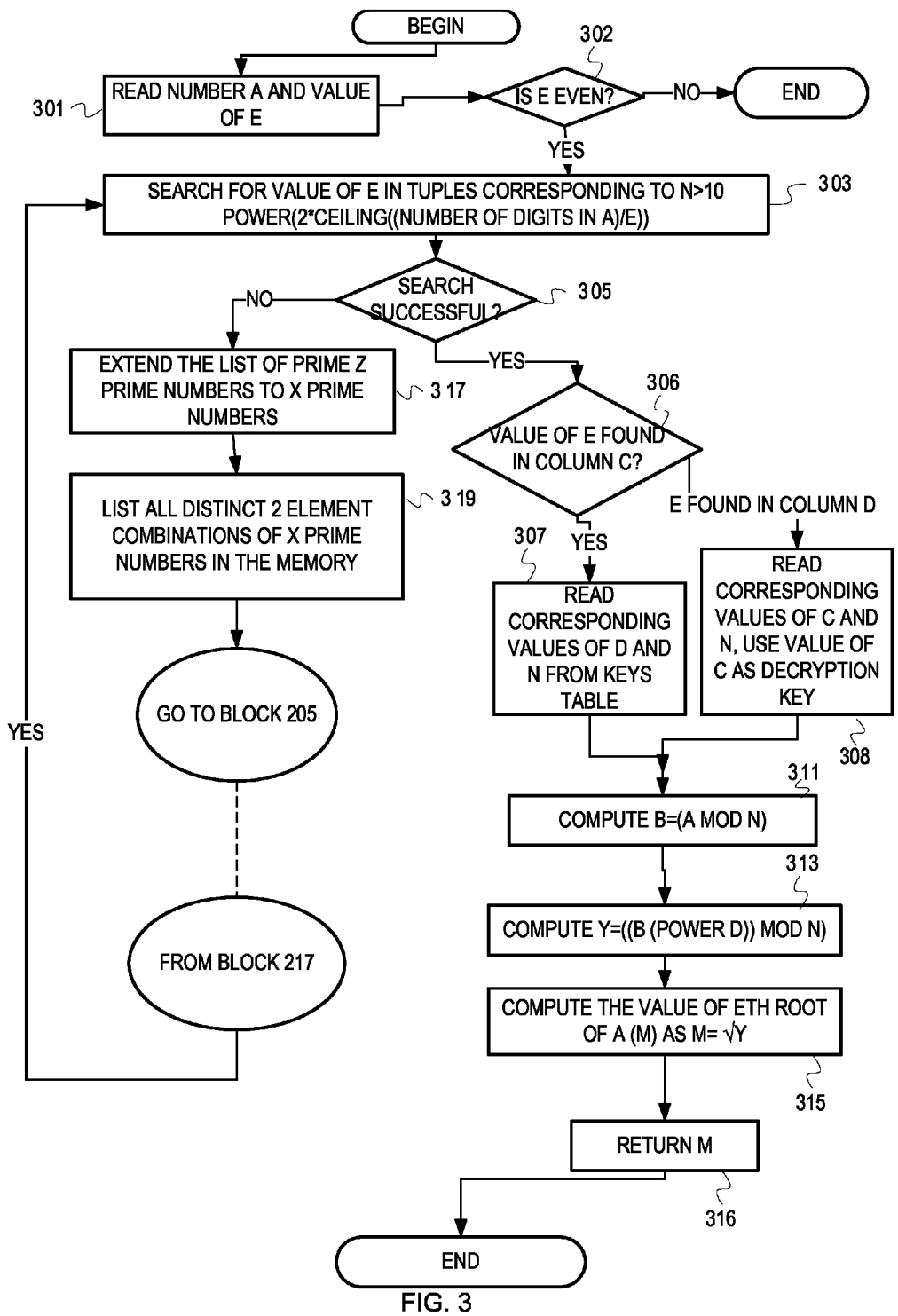
FIG. 3 illustrates a flow diagram of example operations to compute the $e^{th}$ root of a number using inverse multiplication modulo.

FIG. 3 illustrates a flow diagram of example operations to compute the $e^{th}$ root of a number using inverse multiplication modulo.

At block 301, the $e^{th}$ root program reads a number A and the value of e. A represents the number for which the $e^{th}$ root program computes the value of the $e^{th}$ root.

At block 302, the $e^{th}$ root program determines if the value of e is even. The $e^{th}$ root program computes e % 2. When the value of e % 2 is 0, the value of e is an even number and control flows to block 303. When the value of e % 2 is non-zero, the value of e is an odd number and the $e^{th}$ root program ends the process. In some embodiments, the process performs a different technique for computing an $e^{th}$ root when e is odd.

At block 303, the $e^{th}$ root program searches for the value of e in tuples corresponding to values of N that satisfy, N>10 power(2*ceiling((Number of digits in A)/e)). The $e^{th}$ root program searches for the value of e in entries of columns C and D corresponding to the tuples in the keys table. The $e^{th}$ root program performs a linear search for the value of e. In some embodiments, the $e^{th}$ root program utilizes other search algorithms (e.g., hashing, tries, etc.) to search for the value of e.

At block 305, the $e^{th}$ root program determines if the search for the value of e was successful. If the search for the value of e was successful, control flows to block 306. If the search for the value of e was not successful, control flows to block 317.

At block 306, the $e^{th}$ root program determines if the value of e was found in column C. If the value of e was found in column C, control flows to block 307. When the value of e is not found in column C and the search for e is successful, the value of e is found in column D. If the value of e is found in column D, control flows to block 308.

At block 307, the $e^{th}$ root program reads values of D and N corresponding to the entry for the value of e in column C, from the keys table. D represents a decryption key and N represents the modulus for a RSA algorithm variant. The control then flows to block 311.

At block 308, the $e^{th}$ root program reads values of C and N corresponding to the entry for the value of e in column D, from the keys table. The $e^{th}$ root program uses the value of C as the decryption key, for the RSA algorithm variant. The control then flows to block 311.

At block 311, the $e^{th}$ root program computes the value of B as (A mod N). B represents the result of encryption in the RSA algorithm variant. From block 311, control flows to block 313.

At block 313, the $e^{th}$ root program computes the value of Y as ((B (power D)) mod N). Y represents the result of decryption. The $e^{th}$ root program computes B (power D) using the technique of exponentiation by squaring. For example, the value of 8 power 4 can be computed using the exponentiation by squaring technique as ((8 power 2)power 2)=(64 power 2)=4096.

At block 315, the $e^{th}$ root program computes the value of $e^{th}$ root of A (M) as $\sqrt{Y}$.

At block 316, the $e^{th}$ root program returns the value of M and the $e^{th}$ root program ends the process.

If the value of e was not found in the keys table at block 305, then the $e^{th}$ root program extends the list of z prime numbers to x prime numbers at block 317. The additional prime numbers for extending the list are programmed into the $e^{th}$ root program by the administrator. In some embodiments, the $e^{th}$ root program only adds the prime numbers that are larger than a certain lower limit. For example, the lower limit is set as (ceiling(number of digits in A)/e). The lower limit on values of prime numbers allows values of N to be sufficiently large for the value of e to be successfully found in the keys table.

At block 319, the $e^{th}$ root program lists all distinct 2 element combinations of x prime numbers in the memory. The $e^{th}$ root program determines all distinct 2 element combinations from a list of x prime numbers in accordance with the combinations principle $^xC_2$. The $e^{th}$ root program writes all distinct 2 element combinations as a list in the memory. From block 319, control flows to block 205 of FIG. 2. Control returns to block 303 of FIG. 3 after the $e^{th}$ root program determines that the values for P, Q, N, C, and D for the extended prime numbers have been written into the keys table at block 217.

In some embodiments, if the search for the value of e is not successful at block 305, the $e^{th}$ root program records the failure of search as a "miss". In case of a miss the $e^{th}$ root program computes the $e^{th}$ root of a number using one of the conventional techniques and the $e^{th}$ root program computes new values of P, Q, N, C and D (operations starting at block 317) in the background. The new values of P, Q, N, C and D are added to the keys table and utilized for future computations. Addition of the new values of P, Q, N, C and D reduces the probability of a miss in future computations.

Those of ordinary skill in the art should understand that the depicted flowcharts are examples to aid in understanding the inventive subject matter, and should not be used to limit the scope of the claims. Although the flow diagram illustrates computing the $e^{th}$ root of one number at a time. The $e^{th}$ root program can perform similar operations to compute an $e^{th}$ root of multiple numbers in parallel. The operations are not limited to factorizing the value of J at block 213 using Dixon's algorithm. In some embodiments, the $e^{th}$ root program factorizes the value of J using other algorithms (e.g., Shor's algorithm, etc.). As another example, creation of the list of prime number combinations at block 203 in FIG. 2 can overlap with the operations of blocks 205, 206, and 209. In some embodiments, a single different data structure is instantiated. The $e^{th}$ root program instantiates the data structure and populates it with the prime number pairs and products thereof. The $e^{th}$ root program sorts the prime number combinations and respective products in the data structure, and then starts to populate the data structure with the values for C and D.

Although examples illustrate that the $e^{th}$ root program stores the list of 2 element combination of prime numbers in a descending order of values of N, the $e^{th}$ root program may store the list in ascending order of values of N, or in no particular order. Similarly, entries in a keys table are not limited to being stored in descending order of values of N. The $e^{th}$ root program may store the entries in the keys table in ascending order of values of N, or in no particular order. The $e^{th}$ root program is not limited to storing 2 element combinations of prime numbers as lists. The 2 element combinations of prime numbers may be stored in some other data structure other than list (e.g., queue, table, etc.).

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
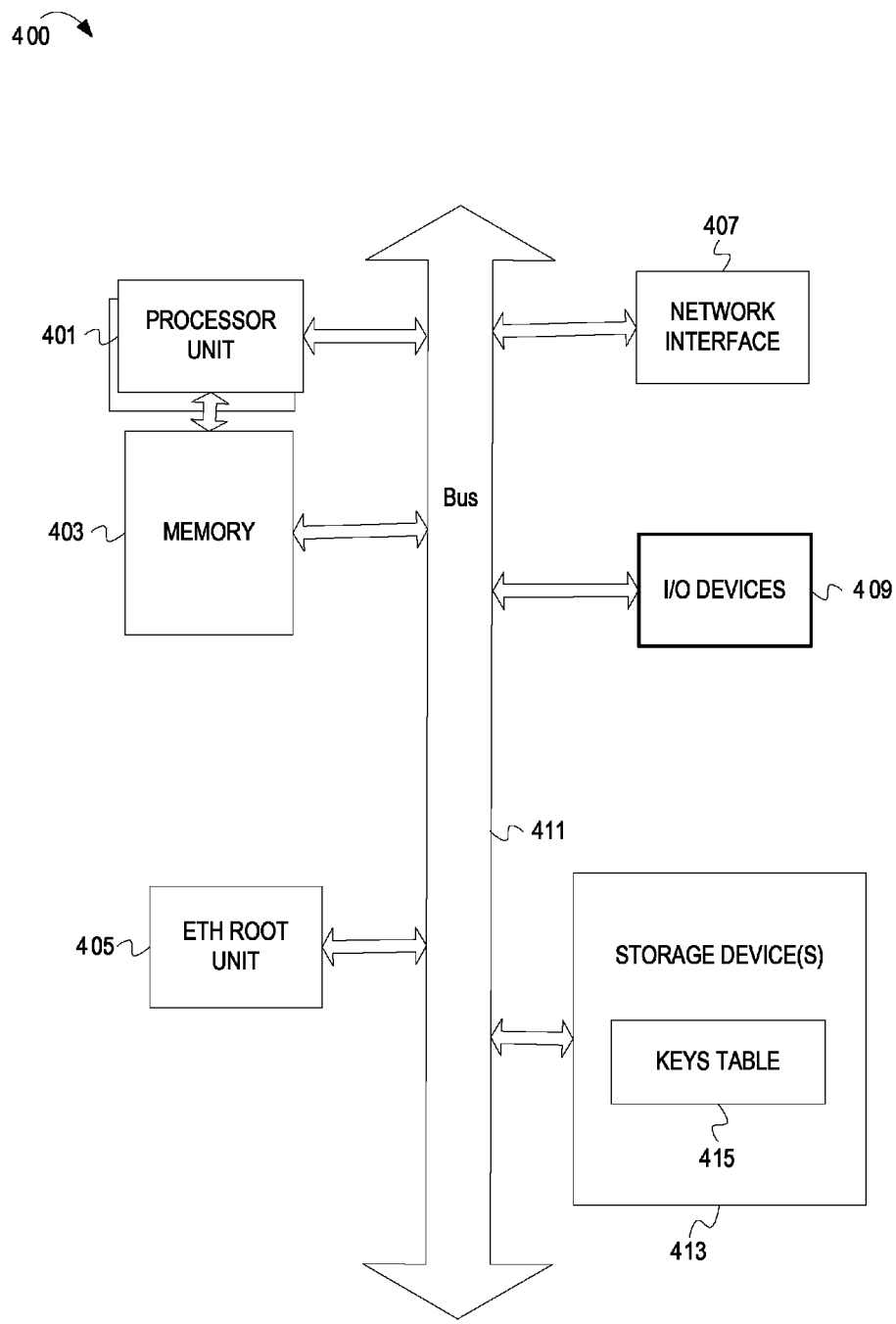
FIG. 4 depicts an example computer system 400.

FIG. 4 depicts an example computer system. A computer system includes a processor unit 401 (possibly including multiple processors, multiple cores, multiple nodes, and/or implementing multi-threading, etc.). The computer system includes memory 403. The memory 403 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 411 (e.g., PCI bus, ISA bus, PCI-Express, HyperTransport® bus, InfiniBand® bus, NuBus bus, etc.), a network interface 407 (e.g., an ATM interface, an Ethernet interface, a Frame Relay interface, SONET interface, wireless interface, etc.), I/O devices 409 (e.g. keyboard, mouse, monitor, microphone, speaker, etc.), a storage device(s) 413 (e.g., optical storage, magnetic storage, etc.), an $e^{th}$ root unit 405 and a keys table 415. The keys table 415 stores prime numbers, modulus values, encryption keys and decryption keys. The keys table 415 is embodied in the storage device(s) 413. The keys table 415 may be embodied in the memory 403 and/or loaded into the memory 403. The $e^{th}$ root unit 405 performs operations to write values into the keys table 405 and computes the $e^{th}$ root of a number for an even e, using a RSA algorithm variant. The $e^{th}$ root unit 405 may be a hardware chip (e.g., PLA, PAL, FPGA, etc.) programmed with program instructions to perform the functionality as described above. The $e^{th}$ root unit 405 may be implemented with an application specific integrated circuit, in logic implemented in the processor unit 401, in a co-processor on a peripheral device or card, etc. In addition, at least some of the functionality of the $e^{th}$ root unit 405 may be embodied as program instructions in the memory 403 or the storage device(s) 413. Any one of these functionalities may be partially (or entirely) implemented in hardware and/or on the processing unit 401. Further, realizations may include fewer or additional components not illustrated in FIG. 4 (e.g., video cards, audio cards, additional network interfaces, peripheral devices, etc.). The processor unit 401, the storage device(s) 413, the $e^{th}$ root unit 405, the I/O devices 409 and the network interface 407 are coupled to the bus 411. Although illustrated as being coupled to the bus 411, the memory 403 may be coupled to the processor unit 401.

While the embodiments are described with reference to various implementations and exploitations, it will be understood that these embodiments are illustrative and that the scope of the inventive subject matter is not limited to them. In general, techniques for computing the $e^{th}$ root of a number for even e's as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method of computing an $E^{th}$ root of a number A with a machine, the method comprising:
    locating a value E, which is even, in a first entry of a plurality of entries of a structure,
        wherein each of the plurality of entries comprises a pair of prime numbers P and Q that are a distinct combination of prime numbers with respect to the other entries, a product of the pair of prime numbers, and a pair of key values, wherein the pair of key values satisfies a property that the product of the pair of key values is K*(P−1)*(Q−1)+2, wherein K is a positive integer;
        wherein the value E is a first key value of the pair of key values in the first entry;
    reading the product of the pair of prime numbers from the first entry;
    reading a second of the pair of key values in the first entry;
    encrypting the number A using the product of the pair of prime numbers to generate an encrypted value;
    applying a decryption operation to the encrypted value using the second of the pair of key values to generate an intermediate value;
    computing a square root of the intermediate value; and
    supplying the square root of the intermediate value as the $E^{th}$ root of the number A.

2. The method of claim 1, wherein said encrypting the number A using the product of the pair of prime numbers to generate the encrypted value comprises computing A modulo N, wherein N represents the product of the pair of prime numbers.

3. The method of claim 1, wherein said applying the decryption operation to the encrypted value using the second of the pair of key values to generate the intermediate value comprises computing (B^D) modulo N, wherein B represents the encrypted value, D represents the second of the pair of key values, and N represents the product of the pair of prime numbers.

4. The method of claim 1 further comprising receiving the number A.

5. The method of claim 1 further comprising searching the structure for the value E, wherein said locating the value E in the first entry is responsive to said searching the structure for the value E.

6. The method of claim 1 further comprising:
    failing to locate the value E in a set of entries of the structure;
    generating additional entries with a background process while computing the $E^{th}$ root of the number A in accordance with a conventional technique, wherein the plurality of entries at least comprises the additional entries.

7. The method of claim 6, wherein generating the additional entries comprises:
    determining a plurality of distinct pairs of prime numbers;
    computing a product of each of the plurality of distinct pairs of prime numbers;
    for each of the plurality of distinct pairs of prime numbers,
        for each of a set of previously defined positive integers,
            computing a value J as K*(P−1)*(Q−1)+2, wherein K represents the previously defined positive integer, P and Q represent the distinct pair of prime numbers,
            determining prime number factors of J;
            determining distinct pairs of factors of J with the prime number factors; and
        storing each of the distinct pairs of factors in the structure as pairs of key values in association with the distinct pair of prime numbers.

8. A computer program product for computing an $E^{th}$ root of a number A when E is an even value, the computer program product comprising:
    a non-transitory computer readable storage medium having computer usable program code embodied therewith, the computer usable program code comprising a computer usable program code configured to:
    locate the value E as a first key of a pair of encryption/decryption keys in a structure that hosts a plurality of encryption/decryption key pairs, wherein each of the plurality of encryption/decryption key pairs satisfies a property that a product of the encryption/decryption key pair is K*(P−1)*(Q−1)+2, wherein K represents a defined positive integer, and P and Q represent a pair of prime numbers, wherein each of the plurality of encryption/decryption key pairs is associated with a pair of prime numbers that is a distinct combination with respect to the other pairs of prime numbers;

encrypt the number A, using a variant of an asymmetric key algorithm, with a product of the pair of prime numbers associated with the pair of encryption/decryption keys that includes the value E to generate an encrypted value;

decrypt the encrypted value, using the variant of the asymmetric key algorithm, with a second key of the pair of encryption/decryption keys that include E as the first key to generate an intermediate value and with the product of the pair of prime numbers;

compute a square root of the intermediate value; and supply the square root of the intermediate value as the $E^{th}$ root of the number A.

9. The computer program product of claim 8, wherein the computer usable program code configured to encrypt the number A, using the variant of the asymmetric key algorithm, with a product of the pair of prime numbers associated with the pair of encryption/decryption keys that includes the value E to generate an encrypted value comprises the computer usable program code configured to compute A modulo N, wherein N represents the product of the pair of prime numbers.

10. The computer program product of claim 8, wherein the computer usable program code configured to decrypt the encrypted value, using the variant of the asymmetric key algorithm, with a second key of the pair of encryption/decryption keys that include E as the first key to generate an intermediate value and with the product of the pair of prime numbers comprises the computer usable program code configured to compute (B^D) modulo N, wherein B represents the encrypted value, D represents the second key, and N represents the product of the pair of prime numbers.

11. The computer program product of claim 8, wherein the computer usable program code is further configured to receive the number A.

12. The computer program product of claim 8, wherein the computer usable program code is further configured to search the structure for the value E, wherein said locate the value E in the first entry is responsive to said search the structure for the value E.

13. The computer program product of claim 8, wherein the computer usable program code is further configured to:

fail to locate the value E in a set of entries of the structure;

generate additional entries with a background process while computing the $E^{th}$ root of the number A in accordance with a conventional technique, wherein the plurality of entries at least comprises the additional entries.

14. The computer program product of claim 13, wherein the computer usable program code configured to generate the additional entries comprises the computer usable program code configured to:

determine a plurality of distinct pairs of prime numbers;

compute a product of each of the plurality of distinct pairs of prime numbers;

for each of the plurality of distinct pairs of prime numbers,
for each of a set of previously defined positive integers,
compute a value J as K*(P−1)*(Q−1)+2, wherein K represents the previously defined positive integer, P and Q represent the distinct pair of prime numbers, determine prime number factors of J;

determine distinct pairs of factors of J with the prime number factors; and store each of the distinct pairs of factors in the structure as pairs of key values in association with the distinct pair of prime numbers.

15. An apparatus comprising:

a processor;

a keys table embodied in a storage device coupled to the processor; and an $E^{th}$ root unit configured to:

locate the value E as a first key of a pair of encryption/decryption keys in a structure that hosts a plurality of encryption/decryption key pairs, wherein each of the plurality of encryption/decryption key pairs satisfies a property that a product of the encryption/decryption key pair is K*(P−1)*(Q−1)+2, wherein K represents a defined positive integer, and P and Q represent a pair of prime numbers, wherein each of the plurality of encryption/decryption key pairs is associated with a pair of prime numbers that is a distinct combination with respect to the other pairs of prime numbers;

encrypt the number A, using a variant of the asymmetric key algorithm, with a product of the pair of prime numbers associated with the pair of encryption/decryption keys that includes the value E to generate an encrypted value;

decrypt the encrypted value, using the variant of the asymmetric key algorithm, with a second key of the pair of encryption/decryption keys that include E as the first key to generate an intermediate value and with the product of the pair of prime numbers;

compute a square root of the intermediate value; and supply the square root of the intermediate value as the $E^{th}$ root of the number A.

16. The apparatus of claim 15, wherein the $E^{th}$ root unit configured to encrypt the number A, using the variant of the asymmetric key algorithm, with a product of the pair of prime numbers associated with the pair of encryption/decryption keys that includes the value E to generate an encrypted value comprises the $E^{th}$ root unit configured to compute A modulo N, wherein N represents the product of the pair of prime numbers.

17. The apparatus of claim 15, wherein the $E^{th}$ root unit configured to decrypt the encrypted value, using the variant of the asymmetric key algorithm, with a second key of the pair of encryption/decryption keys that include E as the first key to generate an intermediate value and with the product of the pair of prime numbers comprises the $E^{th}$ root unit configured to compute (B^D) modulo N, wherein B represents the encrypted value, D represents the second key, and N represents the product of the pair of prime numbers.

18. The apparatus of claim 15, wherein the $E^{th}$ root unit is further configured to search the structure for the value E, wherein said locate the value E in the first entry is responsive to said search the structure for the value E.

19. The apparatus of claim 15, wherein the $E^{th}$ root unit is further configured to:

fail to locate the value E in a set of entries of the structure;

generate additional entries with a background process while computing the $E^{th}$ root of the number A in accordance with a conventional technique, wherein the plurality of entries at least comprises the additional entries.

20. The apparatus of claim 19, wherein the $E^{th}$ root unit configured to generate the additional entries comprises the $E^{th}$ root unit configured to:
    determine a plurality of distinct pairs of prime numbers;
    compute a product of each of the plurality of distinct pairs of prime numbers;
    for each of the plurality of distinct pairs of prime numbers,
        for each of a set of previously defined positive integers,
            compute a value J as $K*(P-1)*(Q-1)+2$, wherein K represents the previously defined positive integer, P and Q represent the distinct pair of prime numbers;
        determine prime number factors of J;
        determine distinct pairs of factors of J with the prime number factors; and
        store each of the distinct pairs of factors in the structure as pairs of key values in association with the distinct pair of prime numbers.

\* \* \* \* \*